United States Patent [19]

Hilt et al.

[11] 3,884,867

[45] May 20, 1975

[54] SELF-EXTINGUISHING POLYOXYMETHYLENE MOLDING COMPOSITIONS REINFORCED WITH GLASS FIBERS

[75] Inventors: Albrecht Hilt; Bruno Sander, both of Ludwigshafen; Willia Hild, Limburgerhof; Hugo Fuchs, Ludwigshafen; Franz Schmidt, Mannheim, all of Germany

[73] Assignee: Badische Anilin- & Soda-Fabrik Aktiengesellschaft, Ludwigshafen (Rhine), Germany

[22] Filed: Aug. 7, 1972

[21] Appl. No.: 278,585

[30] Foreign Application Priority Data
Aug. 11, 1971 Germany.................... 2140195

[52] U.S. Cl................. 260/37 AL; 260/45.7 P
[51] Int. Cl............................................. C08g 51/10
[58] Field of Search............... 260/37 AL, 45.7 P; 106/15 FP

[56] References Cited
UNITED STATES PATENTS

| 3,164,563 | 1/1965 | Maxwell et al. | 260/37 AL |
| 3,450,665 | 6/1969 | Wagner et al. | 260/37 AL |
| 3,477,982 | 11/1969 | Dijkstra et al. | 260/45.7 P |
| 3,546,160 | 12/1970 | Dany et al. | 260/45.7 |
| 3,551,379 | 12/1970 | Dany et al. | 260/45.7 |
| 3,663,174 | 5/1972 | Dany et al. | 423/322 |
| 3,663,654 | 5/1972 | Haaf | 260/45.7 P |
| 3,778,407 | 12/1973 | Hild et al. | 260/45.7 P X |

OTHER PUBLICATIONS

"Flame Retardants," Industrial and Engineering Chemistry, Vol. 61, No. 5, May 1969, page 73. Table V.

*Primary Examiner*—Lewis T. Jacobs
*Attorney, Agent, or Firm*—Johnston, Keil, Thompson & Shurtleff

[57] ABSTRACT

Self-extinguishing molding compositions based on polyoxymethylenes containing from 5 to 15%, preferably 7 to 10%, by weight (based on the total weight of the molding composition) of finely divided red phosphorus and from 1 to 40%, preferably 15 to 35%, by weight (based on the total weight of the molding composition) of glass fibers, and a method of preparing such molding compositions.

7 Claims, No Drawings

SELF-EXTINGUISHING POLYOXYMETHYLENE MOLDING COMPOSITIONS REINFORCED WITH GLASS FIBERS

Polyoxymethylenes, because of their good mechanical properties, are used for the production of high-grade moldings and are thus replacing metallic materials to an increasing extent. However, the flammability of polyoxymethylenes is a disadvantage and this restricts their general application.

It is already known from German Published Application No. 1,544,700 that this disadvantage can be counteracted by adding ammonium phosphate to the polyoxymethylene compounds. The burning behavior of these polyoxymethylene compounds modified with the said additives is unsatisfactory because they are not self-extinguishing. However, what industry needs are self-extinguishing non-metallic materials.

It is also known that glass-fiber-reinforced polyoxymethylenes have particularly valuable mechanical properties. However, it is a disadvantage that polyoxymethylenes reinforced with glass fibers exhibit an even more unfavorable burning behavior than unreinforced polyoxymethylenes because the silicate network accelerates the spreading of the flames owing to its wick effect.

An object of the invention is to provide polyoxymethylene molding compositions which (a) have valuable mechanical properties and (b) are self-extinguishing.

The said object is achieved according to the invention with a polyoxymethylene molding composition which contains from 5 to 15%, preferably from 7 to 10%, by weight (based on the total weight of the molding composition) of finely divided red phosphorus and from 1 to 40%, preferably from 15 to 35%, by weight (based on the total weight of the molding composition) of glass fibers.

These molding compositions are distinguished by outstanding mechanical properties and are moreover self-extinguishing according to ASTM D 635-63.

The addition of red phosphorus to cast resins, thermoplastics and expanded plastics in order to make them flame retardant is already known in the art. It is however extremely surprising that red phosphorus should make polyoxymethylenes self-extinguishing which when heated decompose into gaseous flammable formaldehyde, even in the presence of incorporated glass fibers.

Both oxymethylene homopolymers and copolymers are suitable as polyoxymethylenes according to the invention. The copolymers may contain from 0.1 to 30 mole% of comonomers. Cyclic ethers or acetals or mixtures thereof are mainly used as comonomers.

Red phosphorus usually has a slightly acid reaction owing to the formation of $P_2O_5$ on the surface of the particles. It is therefore advisable to make the red phosphorus neutral or slightly basic by treatment with alkali. Advantageously, from 10 to 4000 ppm, preferably from 100 to 1500 ppm, of sodium carbonate, if desired in the form of soda crystals ($Na_2CO_3 \cdot 10H_2O$), may be added to the red phosphorus prior to or during its incorporation.

In order to incorporate the red phosphorus without danger, it is advantageous to coat it with a solid substance having a melting point of from 50° to 120°C which is distillable. Trioxane or caprolactam is preferred for this purpose. It may be used in an amount of from 25 to 75% by weight based on the mixture of trioxane and phosphorus or of caprolactam and phosphorus.

The glass fibers may be present in the form of continuous filaments (rovings) or short fibers (chopped fibers). The short fibers advantageously have a length of 0.01 to 1 mm. They may be treated with size or coupling agent.

The incorporation of the additives into the polyoxymethylene is usually effected at a temperature above its melting point, especially at from 180° to 220°C. Conventional kneaders such as single-screw or twin-screw kneaders may be used. When a simple kneader or a single-screw kneader is used, it is advisable to use short glass fibers. In the case of twin-shaft screw extruders having kneading elements it is possible to use glass fibers in the form of continuous filaments. de The following Examples illustrate the invention.

EXAMPLE 1

A twin-screw kneader provided with degassing means is fed per hour with 80 kg of polyoxymethylene granules (copolymer with 3.3% of butanediol-1,4-formal) via a metering screw. 24 kg per hour of a mixture of trioxane and red phosphorus (mixing ratio 50:50) and 0.250 kg of soda crystals ($Na_2CO_3 \cdot 10H_2O$) are fed separately into the screw kneader under a nitrogen atmosphere. 40 kg per hour of glass rovings are drawn in by the screws through a devolatilizing port. Mixing is effected at from 180° to 200°C. The trioxane distils off and is extracted through further devolatilizing ports.

125 kg of red granules are obtained which are self-extinguishing according to ASTM D-635-63.

EXAMPLE 2

The procedure described in Example 1 is followed, but
80 kg of polyoxymethylene granules;
19.2 kg of phosphorus-trioxane mixture (50:50);
0.150 kg of soda crystals ($Na_2CO_3 \cdot 10H_2O$); and
38.4 kg of glass rovings
are used. The material obtained (121 kg per hour) is also selfextinguishing according to ASTM D-635-63.

EXAMPLE 3

A mixture of
61 g of polyoxymethylene granules;
18 g of a mixture of trioxane and red phosphorus;
150 mg of soda crystals ($Na_2CO_3 \cdot 10H_2O$) and
30 g of short glass fibers
is melted in a laboratory kneader and mixed well at 190°C. The product obtained (85 g) is self-extinguishing according to ASTM D-635-63.

EXAMPLE 4

The procedure described in Example 3 is followed but 25 g of short glass fibers is used instead of 30 g. 82 g of self-extinguishing polymer compound is obtained.

EXAMPLE 5

The procedure described in Example 3 is followed but 20 g of short glass fibers is used instead of 30 g. The mixture obtained (76 g) is self-extinguishing.

We claim:
1. A self-extinguishing molding composition based on a polyoxymethylene characterized by a content of from 5 to 15% by weight (based on the total weight of the molding composition) of finely divided neutral or basic red phosphorus and by a content of from 1 to 40% by weight (based on the total weight of the molding composition) of glass fibers.

2. A self-extinguishing molding composition as claimed in claim 1 which contains from 7 to 10% by weight of finely divided red phosphorus and from 15 to 35% by weight of glass fibers, the percentages being based on the total weight of the molding composition.

3. A self-extinguishing molding composition based on an oxymethylene copolymer characterized by a content of from 5 to 15% by weight based on the total weight of the molding composition of finely divided neutral or basic red phosphorus and by a content of from 1 to 40% by weight based on the total weight of the molding composition of glass fibers, said oxymethylene copolymer containing from 0.1 to 30 mole % of at least one comonomer selected from the group consisting of cyclic ethers and acetals.

4. A self-extinguishing molding composition as claimed in claim 3 in which the glass fibers have been pretreated with a size or coupling agent.

5. A self-extinguishing molding composition as claimed in claim 3 in which the glass fibers have a length of from 0.01 to 1 mm.

6. A composition as set forth in claim 3 wherein said red phosphorus is coated with a solid substance having a melting point of from 50° to 120°C, said solid substance being distillable.

7. A composition as set forth in claim 6 wherein said solid substance is trioxane or caprolactam.

* * * * *

UNITED STATES PATENT OFFICE
CERTIFICATE OF CORRECTION

PATENT NO. : 3,884,867
DATED : May 20, 1975
INVENTOR(S) : Albrecht Hilt et al.

It is certified that error appears in the above-identified patent and that said Letters Patent are hereby corrected as shown below:

In Column 3, Line 5, delete "1" and substitute --3--

In Column 2, Line 16, delete "de"

Signed and Sealed this eighteenth Day of May 1976

[SEAL]

Attest:

RUTH C. MASON
Attesting Officer

C. MARSHALL DANN
Commissioner of Patents and Trademarks